United States Patent

Valentine

[15] 3,659,828
[45] May 2, 1972

[54] DOUGH KNEADING APPARATUS FOR FORMING PASTRY SHELLS

[72] Inventor: Harold G. Valentine, 117 Manners, Brockton, Mass. 02401

[22] Filed: Oct. 7, 1970

[21] Appl. No.: 78,759

[52] U.S. Cl. ................................................. 259/190
[51] Int. Cl. ................................................. A21c 1/00
[58] Field of Search ............ 107/36, 38, 40; 31/48; 127/14, 127/15, 21; 195/142, 143; 259/4, 7, 20, 21, 22, 31, 32, 39–44, 76–77, 92, 99, 100, 101, 111, 54, 55, 72, 73

[56] References Cited

UNITED STATES PATENTS 3,280,764  10/1966  Potter et al. ............................ 107/38
3,576,168  4/1971  Thylstrup et al. ....................... 107/38

*Primary Examiner*—Jordan Franklin
*Assistant Examiner*—Geo. V. Larkin
*Attorney*—Morse, Altman & Oates

[57] ABSTRACT

A kneading member having a shaft journaled thereto is positioned within a pan having a charge of dough therein. The shaft of a drive motor is fixed to the kneading member shaft by means of a coupler in such a way that the axis of the motor shaft is concentric with the axis of the coupler and the axis of the kneading member shaft is angularly offset from the axis of the motor shaft. The kneading member is provided with an "O" ring about its periphery for sealable engagement with the sidewalls of the pan, both the pan and the kneading member being fixed against rotation. The angular offset of the kneading member shaft with respect to the motor shaft and the journaled connection between the kneading member shaft and the kneading member are such that rotational movement of the kneading member shaft is translated into a non-rotating undulatory movement of the kneading member within the pan. In consequence, the dough is kneaded into the form of a pastry shell.

10 Claims, 4 Drawing Figures

Patented May 2, 1972

3,659,828

INVENTOR.
HAROLD G. VALENTINE
BY
Morse, Altman & Oates
ATTORNEYS

DOUGH KNEADING APPARATUS FOR FORMING PASTRY SHELLS

BACKGROUND OF THE INVENTION

1. Field of the Invention

The present invention relates to pastry shell forming apparatus and more particularly to an apparatus for kneading dough into the form of a pastry shell.

2. Description of the Prior Art

A variety of pastry shell forming apparatus have been developed. Generally, the pastry shell are formed by urging a member against a charge of dough in a pan, whereby the dough is pressed into the form of the pastry shell. The quality of such pastry shells has suffered due to the fact that the dough is merely pressed and not kneaded into the desired form.

SUMMARY OF THE INVENTION

It is an object of the present invention to provide an apparatus for kneading a charge of dough into the form of a pastry shell. The apparatus is characterized by a kneading member which is positioned in registration with a pan having a charge of dough therein. One end of a shaft is journaled to the kneading member and the other end of the shaft is fixed to one end of a coupler, the other end of the coupler is adapted to receive the shaft of a drive motor. The coupler is such that the axis of the motor shaft is concentric with the axis of the coupler and the axis of the kneading member shaft is angularly offset from the axis of the motor shaft. The kneading member is provided with an "O" ring which sealably engages the sidewalls of the pan, the pan and kneading member being fixed against rotation. The offset of the kneading member shaft with respect to the motor shaft and the journaled connection between the kneading member shaft and kneading member is such that a region of closest adjacency is defined between certain locations of the kneading member underside and the bottom interior face of the pan. The region of closest adjacency orbits about the axis of the kneading member shaft axis. That is, the rotational movement of the member shaft is translated into a non-rotating undulatory movement of the kneading member within the pan. The non-rotating undulatory movement of the kneading member kneads the dough into the form of a pastry shell defined by the shape of the pan.

The invention accordingly comprises the apparatus possessing the construction, combination of elements and arrangement of parts that are exemplified in the following detailed description, the scope of which will be indicated in the appended claims.

BRIEF DESCRIPTION OF THE DRAWINGS

For a fuller understanding of the nature and objects of the present invention, reference should be had to the following detailed description, taken in connection with the accompanying drawings, wherein.

DETAILED DESCRIPTION OF INVENTION

Figure 1:
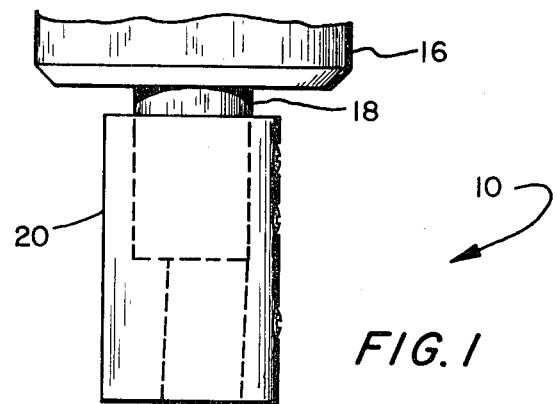
FIG. 1 is a side elevation of an apparatus for kneading dough made according to the invention.

Referring now to FIG. 1, there is shown an apparatus 10 for kneading a charge of dough in a pan 14 into the shape of a pastry shell. Apparatus 10 comprises a motor 16 having an extending shaft 18, an offset coupler 20, and a kneading member 22 having an extending shaft 24.

Kneading member 22 includes a body portion 26, a housing 28, and a band 30. One end of shaft 24 is mounted to housing 28 via a fastener 32 and housing 28 is journaled to body 26 via a plurality of bearings 34, for example ball bearings. The underside of body 26 is dome shaped and defines a convex surface which projects downwardly to approximately 0.125 inch at the longitudinal axis of body 26. Band 30, for example an elastomeric "O" ring, is seated within an annular groove 36 about the periphery of body 26. In right section, the profile of body 26 is slightly smaller than the profile of pan 14 and the profile of "O" ring 30 is slightly larger than the profile of pan 14. Accordingly, pan 14 is adapted to slidably receive body 26 and "O" ring 30 is adapted to sealably engage pan 14, body 26 and pan 14 being in registration.

Pan 14 is seated on an elastomeric pad 38 which is mounted on a reciprocatable platform 40. An actuator 42, for example a hydraulic actuator, is operatively connected to platform 40 for reciprocating pan 14 into engagement and disengagement with kneading member 22, pan 14 and kneading member 22 being engaged when kneading member 22 is positioned in pan 14 and being disengaged when pan 14 is withdrawn from kneading member 22. It is to be understood that, in alternative embodiments, platform 40 is fixed and kneading member 22 is reciprocated and actuator 42 is other than hydraulic, for example, pneumatic or hand operated.

Figure 3:
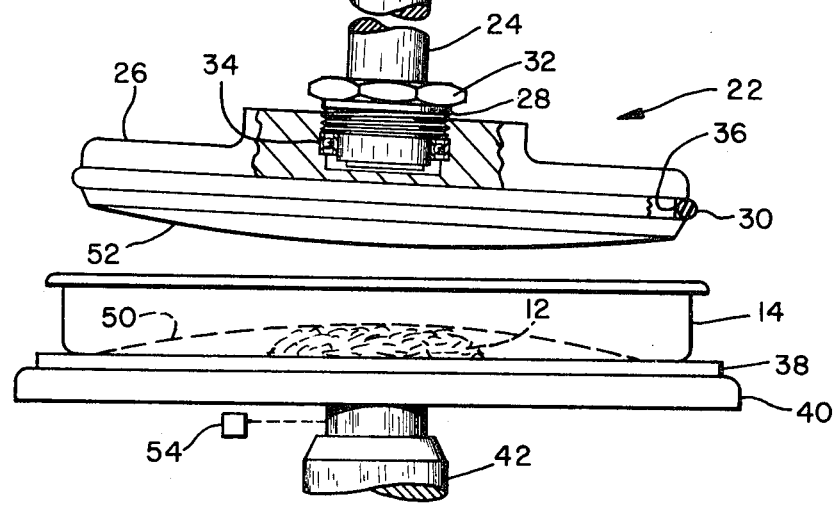
FIG. 3 is a section taken along the lines 3—3 of FIG. 2.
Figure 3:
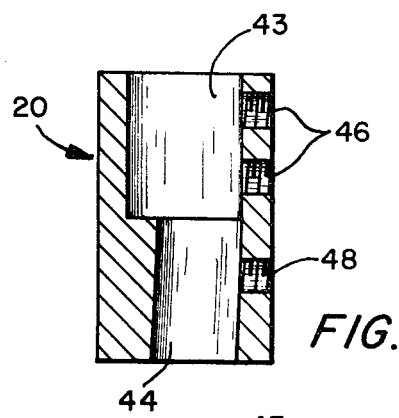
Figure 2:
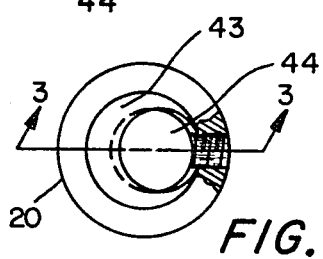
FIG. 2 is a top plan of the coupler of FIG. 1.

Referring now to FIGS. 2 and 3, it will be seen that offset coupler 20 is formed with bores 43 and 44 which are adapted for reception of shafts 18 and 24, respectively. Shafts 18 and 24 are secured to coupler 20 by means of fastening devices 46 and 48, for example set screws. In the illustrated embodiment, coupler 20 is circular in right section and bore 43 is concentric therewith. The axis of bore 44 is angularly offset with respect to the axis of bore 43, for example 5°, in such a direction that their axes converge at the center of the journaled connection of housing 28 and body 26. In a modified embodiment, shafts 18 and 24 are integral and define a bent shaft.

Shaft 18 is secured to housing 28 via fastener 32 in such a way that the axis of shaft 18 is perpendicular to the medial horizontal plane of body 26. The plane of body 26 is oblique to the axis of shaft 18 and the medial horizontal plane of pan 14, the axis of shaft 18 and the plane of pan 14 being perpendicular to each other. Accordingly, when pan 14 and kneading member 22 are engaged, a region of closest adjacency is defined between certain locations of the convex surface of kneading member 22 and the interior bottom face of pan 14. As hereinafter described, the region of closest adjacency orbits about the point defined by the convergency of the axes of shafts 18 and 24. In an alternative embodiment, the axes of bores 43 and 44 converge along the longitudinal axis of coupler 30 at the bottom face thereof. In consequence, the region of closest adjacency orbits about a circle, the radius of which is defined by the distance between the axes of shafts 18 and 24 as measured at the journaled connection of housing 28 and body 26.

Figure 4:
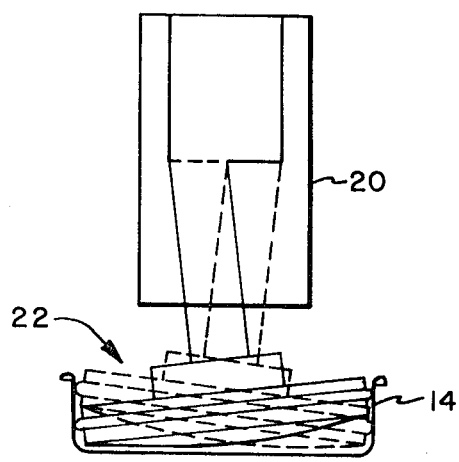
FIG. 4 is a diagramatic showing the non-rotating undulatory movement of the kneading member of FIG. 1

In order to facilitate a better understanding of the region of closest adjacency between kneading member 22 and a pan 14 in response to the rotation of shaft 18, reference is now made to FIG. 4. The solid lines of FIG. 4 represent the position of kneading member 22 for a first position of shaft 24 and the dashed lines represent a second position of kneading member 22 after shaft 24 has rotated 180°. As viewed in FIG. 4, the region of closest adjacency between kneading member 22 and pan 14 is to the left of the longitudinal axis of coupler 20 when shaft 24 is in the first position and is to the right of the longitudinal axis of coupler 20 when shaft 24 is in the second position. In other words, the rotational movement of shaft 24 is translated into a non-rotating undulatory movement of kneading member 22 within pan 14. As previously stated, when kneading member 22 and pan 14 are engaged, "O" ring 30 sealably engages the sidewalls of pan 14 whereby pan 14 and kneading member 22 are fixed against rotation.

In operation of apparatus 10, charge of dough 12 is placed within pan 14, for example a pizza pan. For best results and for sanitary reasons, a web 50 composed, for example, of a plastic film of vinylidene chloride copolymer and having a profile substantially conforming to the profile of pan 14 is placed over dough 12. Thereafter, actuator 42 is energized, in consequence pan 14 is brought into engagement with kneading member 22, "O" ring 30 sealably engaging the sidewalls of pan 14. In the preferred embodiment, the convex surface of body 26 is provided with a release coating 52, for example, a plastic consisting of tetrafluoroethelyne polymer. Motor 16 is activated, in consequence region of closest adjacency between certain locations of the convex surface of kneading member 22 and the interior bottom face of pan 14 orbits about the point of convergence of the axes of shafts 18 and 24. It is to be remembered that kneading member 22 is fixed against rotation. Accordingly, the rotational movement of shaft 24 is translated into a non-rotating undulatory movement of kneading member 22 within pan 14. In consequence, dough 12 is kneaded into the shape of a pizza shell, the profile of which is defined by pan 14. A control 54, such as limit switch, for example, is provided for controlling the distance between kneading member 22 and pan 14. It will be readily appreciated that the thickness of the pizza shell is specified by the distance between kneading member 22 and pan 14.

Since certain changes may be made in the foregoing disclosure without departing from the scope of the invention herein involved, it is intended that all matter contained herein be construed in an illustrative and not in a limiting sense.

What is claimed is:

1. An apparatus for kneading a charge of dough positioned in pan means into the shape of a pastry shell comprising:
   a. shaft means;
   b. kneading member means journaled to one end of said shaft means, said pan means adapted for reception of said kneading member means, the medial horizontal plane of said pan means being oblique with respect to the medial horizontal plane of said kneading member means;
   c. means for engaging and disengaging said kneading member means and pan means, said kneading member means and pan means being engaged when said kneading member means is positioned within said pan means and disengaged when said kneading member means is positioned without said pan means; and
   d. means operatively connected to said shaft means for rotating said shaft means, the axis of said shaft means being oblique to the longitudinal axis of said rotating means, a region of closest adjacency being defined between certain locations of said kneading member and pan means, said region of closest adjacency orbiting about the axis of said shaft means as said shaft means rotates.

2. The apparatus as claimed in claim 1 including coupler means interposed between said shaft means and rotating means, said coupler means formed with at least first and second bores, the axis of said first bore concentric with the axis of said coupler means, the axis of said second bore oblique to the axis of said first bore and substantially perpendicular to the plane of said kneading member means, said shaft means secured within said second bore.

3. The apparatus as claimed in claim 1 wherein said kneading member includes:
   a. housing means adapted for reception of said shaft means; and
   b. body means, said housing means journaled to said body means.

4. The apparatus as claimed in claim 3 wherein said body means is formed with an annular groove, elastomeric band means seated within said groove, said band means adapted to sealably engaged said pan means when said kneading member means and pan means are engaged.

5. The apparatus as claimed in claim 4 wherein the underside of said body means is dome shaped.

6. The apparatus as claimed in claim 5 wherein said dome shaped underside of said body means is provided with a release coating composed of a tetrafluoroethylene polymer.

7. An apparatus for kneading a charge of dough into the shape of a pizza shell comprising:
   a. shaft means;
   b. body means formed with an annular groove, one end of said shaft means journaled to said body means, the medial horizontal plane of said body means being substantially perpendicular to the axis of said shaft means;
   c. elastomeric band means seated within said groove;
   d. means operatively connected to the other end of said shaft means for rotating said shaft means;
   e. coupler means formed with at least first and second bores, the axis of said second bore angularly offset from the axis of said first bore, the axis of said first bore concentric with the axis of said coupler, said rotating means operatively connected to said coupler means within said first bore, said shaft means operatively mounted within said second bore;
   f. pan means having the shape of a pizza shell, said pan means adapted for reception of said body means and for sealable engagement with said band means, the medial horizontal plane of said pan means being substantially perpendicular to the axis of said coupler means; and
   g. means operatively connected to said body means for engaging and disengaging body means and pan means, said body means and pan means being engaged when said body means is positioned within said pan means and said band means sealably engages said pan means and being disengaged when said pan means is withdrawn from said body means;
   h. a region of closest adjacency being defined between certain locations of said body means and pan means, said region of closest adjacency orbiting about the axis of said shaft means as said shaft is rotated by said rotating means.

8. The apparatus as claimed in claim 7 wherein the underside of said body means is dome shaped.

9. The apparatus as claimed in claim 7 wherein said means for engaging and disengaging includes:
   a. platform means, said pan means operatively connected to said platform means; and
   b. actuator means operatively connected to said platform means for reciprocating said platform means.

10. The apparatus as claimed in claim 9 including elastomeric pad means interposed between said platform means and pan means.

* * * * *